(12) United States Patent
Oh

(10) Patent No.: US 7,525,272 B2
(45) Date of Patent: Apr. 28, 2009

(54) METHOD OF PROTECTING FUEL DOOR

(75) Inventor: Jong-Hwan Oh, Seoul (KR)

(73) Assignee: Kia Motors Corporation, Seoul (KR)

( * ) Notice: Subject to any disclaimer, the term of this patent is extended or adjusted under 35 U.S.C. 154(b) by 249 days.

(21) Appl. No.: 11/796,633

(22) Filed: Apr. 27, 2007

(65) Prior Publication Data

US 2008/0122246 A1 May 29, 2008

(30) Foreign Application Priority Data

Nov. 27, 2006 (KR) .................. 10-2006-0117574

(51) Int. Cl.
  *G05D 3/00* (2006.01)
  *B60J 5/06* (2006.01)
(52) U.S. Cl. .................. 318/466; 318/266; 318/283; 296/97.22; 296/155
(58) Field of Classification Search .................. 318/283, 318/266, 466, 432; 307/10.1; 296/97.22, 296/155; 49/360, 362; 340/825.69; 74/500.5
See application file for complete search history.

(56) References Cited

U.S. PATENT DOCUMENTS

| | | | |
|---|---|---|---|
| 6,007,141 A | | 12/1999 | Thomas et al. |
| 6,075,460 A | * | 6/2000 | Minissale et al. ...... 340/825.69 |
| 6,079,767 A | * | 6/2000 | Faubert et al. .............. 296/155 |
| 6,091,162 A | * | 7/2000 | Williams et al. ........... 307/10.1 |
| 6,189,406 B1 | * | 2/2001 | Kapes et al. ................ 74/500.5 |
| 6,256,930 B1 | * | 7/2001 | Faubert et al. ................ 49/362 |
| 6,256,932 B1 | * | 7/2001 | Jyawook et al. .............. 49/503 |
| 6,276,743 B1 | * | 8/2001 | Jyawook et al. ............. 296/155 |
| 6,323,565 B1 | * | 11/2001 | Williams et al. ........... 307/10.1 |
| 6,435,600 B1 | * | 8/2002 | Long et al. .................. 296/155 |
| 6,588,829 B2 | * | 7/2003 | Long et al. .................. 296/155 |
| 6,994,392 B2 | * | 2/2006 | Seto ........................ 296/97.22 |
| 2001/0010429 A1 | * | 8/2001 | Jyawook et al. ............. 292/347 |
| 2002/0153744 A1 | * | 10/2002 | Long et al. .................. 296/155 |
| 2005/0230999 A1 | * | 10/2005 | Seto ........................ 296/97.22 |
| 2006/0220412 A1 | * | 10/2006 | Norton ...................... 296/97.2 |
| 2007/0107313 A1 | * | 5/2007 | Suzuki et al. ................. 49/360 |
| 2007/0132273 A1 | * | 6/2007 | Suzuki et al. ............... 296/155 |

FOREIGN PATENT DOCUMENTS

| | | |
|---|---|---|
| JP | 10252347 | 9/1998 |
| JP | 11078527 | 3/1999 |
| JP | 2004106577 | 4/2004 |

\* cited by examiner

*Primary Examiner*—Paul Ip
(74) *Attorney, Agent, or Firm*—Morgan, Lewis & Bockius LLP

(57) ABSTRACT

A control method of a sliding door of a vehicle. A first step engages a clutch of the sliding door if an obstacle is detected during manipulation of the sliding door, and waits for a sliding door manipulation signal to be input. A second step determines whether a fuel door is open. A third step determines whether the signal is input again if the fuel door is open at the second step. A fourth step disengages the clutch if the signal is input again at the third step.

5 Claims, 2 Drawing Sheets

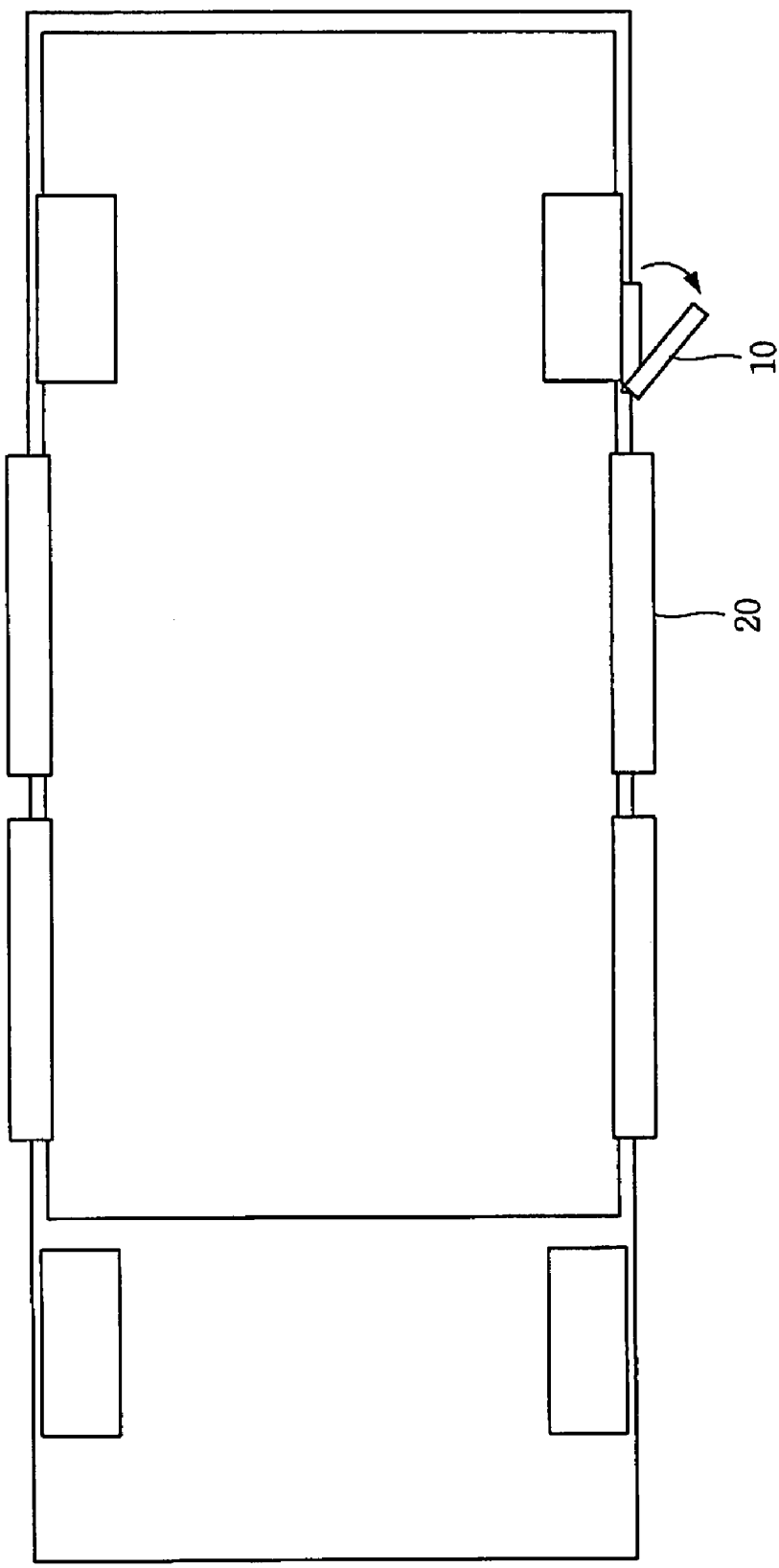

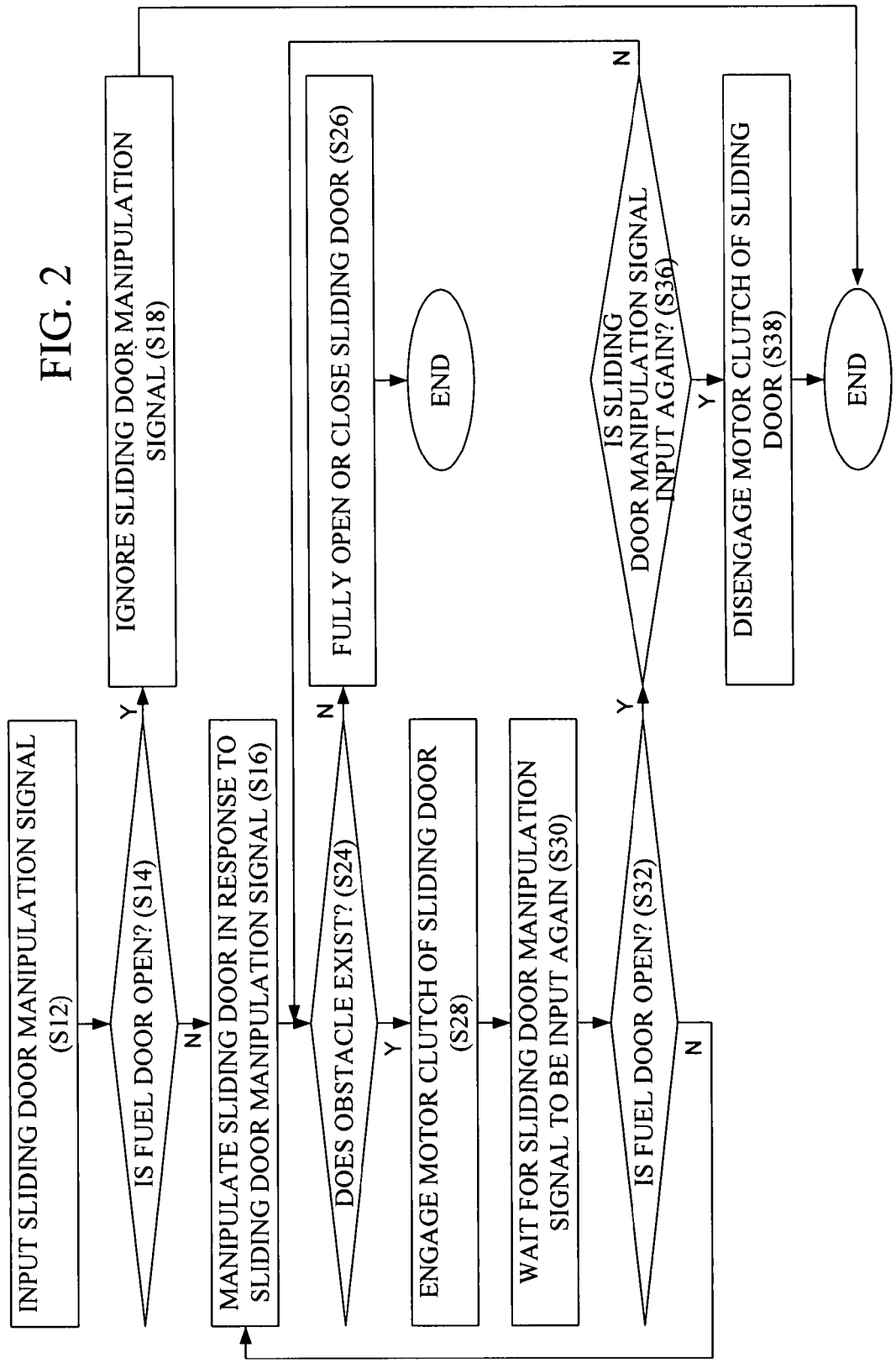

METHOD OF PROTECTING FUEL DOOR

CROSS-REFERENCE TO RELATED APPLICATIONS

The present application is based on, and claims priority to, Korean Application Serial Number 10-2006-0117574, filed on Nov. 27, 2006, the disclosure of which is hereby incorporated by reference herein in its entirety.

FIELD OF THE INVENTION

The present invention relates to a method of protecting a fuel door.

BACKGROUND OF THE INVENTION

Typically, a fuel door protection system prevents a fuel door from being damaged if a sliding door is opened toward the fuel door while fuel is being supplied. If a sliding door manipulation signal is input, the system determines whether the fuel door is open. If the fuel door is determined to be open, the fuel door protection system ignores the sliding door manipulation signal. Also, the conventional fuel door protection system determines whether an obstacle, interrupting the manipulation of the sliding door, exists. If an obstacle is determined to exist, the system engages a motor clutch of the sliding door, stopping operation of the sliding door. The sliding door can be operated only after a sliding door manipulation signal is input again, unless the motor clutch is disengaged.

In such a conventional fuel door protection system, the steps that control based on the fuel door have higher priority than the steps that control based on an obstacle. Also, if the fuel door is opened when the motor clutch is engaged, even if the sliding door manipulation signal is input again, it is impossible to manipulate the sliding door.

SUMMARY OF THE INVENTION

Embodiments of the present invention provide a method of protecting a fuel door, which can allow a sliding door to be manipulated even when a fuel door is open while the motor clutch of the sliding door is engaged.

A first step engages a clutch of the sliding door if an obstacle is detected during manipulation of the sliding door, and waits for a sliding door manipulation signal to be input. A second step determines whether a fuel door is open. A third step determines whether the sliding door manipulation signal is input again if the fuel door is determined to be open at the second step. A fourth step disengages the clutch if the sliding door manipulation signal is determined to be input again at the third step.

A fifth step manipulates the sliding door in response to the sliding door manipulation signal if the fuel door is determined not to be open at the second step. A sixth step returns to the first step if the sliding door manipulation signal is determined not to be input again at the third step.

A seventh step determines whether the fuel door is open if the sliding door manipulation signal has been input. An eighth step manipulates the sliding door in response to the sliding door manipulation signal if the fuel door is determined not to be open at the seventh step. A ninth step ignores the sliding door manipulation signal if the fuel door is determined to be open at the seventh step.

A tenth step determines whether the obstacle exists during the eighth step. An eleventh step opens or closes the sliding door in response to the sliding door manipulation signal if the obstacle is not determined to exist at the tenth step. A twelfth step engages the clutch if the obstacle is determined to exist at the tenth step.

The first to sixth steps have higher priority than the seventh to twelfth steps, and the seventh to ninth steps have higher priority than the tenth to twelfth steps.

BRIEF DESCRIPTION OF THE DRAWINGS

For a better understanding of the nature and objects of the present invention, reference should be made to the following detailed description with the accompanying drawings, in which:

FIG. 1 illustrates a fuel door protection system.

FIG. 2 is a flowchart showing a method of protecting a fuel door according to an exemplary embodiment of the present invention.

DETAILED DESCRIPTION OF THE PREFERRED EMBODIMENTS

In an exemplary embodiment, a sliding door manipulation signal is input at step S12. Whether the fuel door 10 is open is determined at S14. If the fuel door 10 is open, the sliding door manipulation signal is ignored at step S18. The sliding door 20 is not operated, and the method ends. If the fuel door is not open at step S14, the sliding door 20 is manipulated in response to the sliding door manipulation signal, at step S16.

When the sliding door 20 is being manipulated at step S16, whether an obstacle, that could hinder movement of the sliding door 20, exists is determined at step S24. If no obstacle exists, the sliding door 20 is fully opened or closed at step S26, and the method ends.

If an obstacle is determined to exist at step S24, a motor clutch of the sliding door is engaged at step S28, and the method then waits for a sliding door manipulation signal to be input again, at step S30. When the sliding door manipulation signal is input again, at step S30, the method again determines whether the fuel door is open, at step S32. If the fuel door is not open, the method returns to step S16.

If the fuel door is determined to be open at step S32, whether the sliding door manipulation signal is input again is determined, at step S36. If the sliding door manipulation signal is not input again at step S36, the method returns to step S24. If the sliding door manipulation signal is input again at step S35, the motor clutch is disengaged, and the method ends.

As apparent from the foregoing, the fuel door protection method according to an exemplary embodiment of the present invention can allow a sliding door to be manipulated even when a fuel door is open while the motor clutch of the sliding door is engaged.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control method of a sliding door of a vehicle, comprising:
    a first step of engaging a clutch of the sliding door if an obstacle is detected during manipulation of the sliding door, and of waiting for a sliding door manipulation signal to be input;

a second step of determining whether a fuel door is open;

a third step of determining whether the sliding door manipulation signal is input again if the fuel door is determined to be open at the second step; and a fourth step of disengaging the clutch if the sliding door manipulation signal is determined to be input again at the third step.

2. The method as defined in claim 1, further comprising:

a fifth step of manipulating the sliding door in response to the sliding door manipulation signal if the fuel door is determined not to be open at the second step; and a sixth step of returning to the first step if the sliding door manipulation signal is determined not to be input again at the third step.

3. The method as defined in claim 2, further comprising:

a seventh step of determining whether the fuel door is open if the sliding door manipulation signal has been input;

an eighth step of manipulating the sliding door in response to the sliding door manipulation signal if the fuel door is determined not to be open at the seventh step; and a ninth step of ignoring the sliding door manipulation signal if the fuel door is determined to be open at the seventh step.

4. The method as defined in claim 3, further comprising:

a tenth step of determining whether the obstacle exists during the eighth step;

an eleventh step of opening or closing the sliding door in response to the sliding door manipulation signal if the obstacle is not determined to exist at the tenth step; and a twelfth step of engaging the clutch if the obstacle is determined to exist at the tenth step.

5. The method as defined in claim 4, wherein the first to sixth steps have higher priority than the seventh to twelfth steps, and the seventh to ninth steps have higher priority than the tenth to twelfth steps.

* * * * *